United States Patent [19]

Karg et al.

[11] Patent Number: 5,266,640
[45] Date of Patent: Nov. 30, 1993

[54] WEATHER AND HEAT RESISTANT BLENDED NITRILE POLYMERS

[75] Inventors: Rudolph Karg; Connie L. Hill, both of Baton Rouge, La.

[73] Assignee: DSM Copolymer, Inc., Baton Rouge, La.

[21] Appl. No.: 657,150

[22] Filed: Feb. 14, 1991

[51] Int. Cl.$^5$ ............................................. C08L 9/00
[52] U.S. Cl. .................................... 525/234; 525/237; 525/238; 525/259; 525/329.1; 525/331.9; 525/333.2; 525/914; 525/942
[58] Field of Search ............ 525/234, 238, 259, 329.1, 525/331.9, 333.2, 914, 942, 237

[56] References Cited

U.S. PATENT DOCUMENTS

| | | | |
|---|---|---|---|
| 4,421,884 | 12/1983 | Oyama et al. | 525/234 |
| 4,486,480 | 12/1984 | Okumoto et al. | 525/238 |
| 4,647,627 | 3/1987 | Buding et al. | 525/234 |
| 4,689,290 | 8/1987 | Worns | 522/110 |
| 4,963,621 | 10/1990 | Szentivanyi et al. | 525/193 |

*Primary Examiner*—Melvyn I. Marquis
*Assistant Examiner*—Randy Gulakowski
*Attorney, Agent, or Firm*—Rockey, Rifkin and Ryther

[57] ABSTRACT

An ozone and heat resistant polymer blend prepared from a first solid, high acrylonitrile nitrile/conjugated diene copolymer and a second, solid, fully hydrogenated nitrile/conjugated diene copolymer, blended in a ratio of about 70:30 to about 50:50.

20 Claims, No Drawings

WEATHER AND HEAT RESISTANT BLENDED NITRILE POLYMERS

The present invention relates to blends of nitrile copolymers with fully hydrogenated nitriles to achieve desirable properties including ozone resistance, fuel and oil resistance and heat resistance

BACKGROUND OF THE INVENTION

Nitrile polymers and copolymers, and especially nitrile rubber, are widely employed in applications in which fuel and oil resistance are desirable, or in which heat resistance is desired. Such polymers and copolymers are well-known, however, for their poor weathering properties. Particularly, these polymers are known to display surface cracking as a result of exposure to ozone rich atmospheres. Poor weathering resistance has limited the use of such polymers and copolymers in applications such as belts, hoses, hose covers, wire covers, and other applications in which the compounded and cured nitrile polymer is exposed to a hostile atmosphere.

Unhydrogenated nitrile copolymers having a high acrylonitrile content (45-55% by weight acrylonitrile) provide low fuel and oil permeability, and slightly better weather resistance than lower acrylonitrile copolymers, but exhibit poor processability. Such copolymers also tend to exhibit high temperature properties characteristic of nitrile rubbers.

Hydrogenated nitrile copolymers, on the other hand, are known to have a longer high temperature service life than their unhydrogenated counterparts, and those that are fully (100%) saturated (or hydrogenated) exhibit good weather resistance. Such compositions are prohibitively expensive for many applications in which high service temperatures are required, since hydrogenation typically employs expensive and unrecoverable catalyst systems.

In order to overcome weatherability problems, such as ozone resistance, PVC has been blended with nitrile polymers and copolymers to obtain ozone protection. Though providing ozone protection, thermoplastic PVC imparts poor heat resistance to the blended polymer. This has the adverse effect of limiting the heat resistance, low temperature properties, and flexibility of the blended polymer, since the thermoplastic characteristics of the PVC are found in the resulting blended polymer.

Others have attempted to obtain improved heat resistance by blending mineral fillers, or by employing CdO-sulfur donor or peroxide cure systems, in the production of nitrile rubber. These systems have, however, provided only slight improvement in the service life of nitrile polymers and copolymers at high temperatures, but they do not improve weatherability.

Another solution proposed to overcome these problems is combining hydrogenated nitrile rubber with a low molecular weight liquid copolymer of acrylonitrile and butadiene. For instance in U.S. Pat. No. 4,647,627, a mixture or covulcanizate of acrylonitrile-butadiene copolymers is prepared from 90-55 percent by weight of 18-49 percent conventional type acrylonitrile copolymer (Mooney viscosity ML 1+4/100° C. of 25 ME minimum), and from 10-45 percent by weight partially or completely hydrogenated liquid copolymer having an average molecular weight of 0.5-30 kg/mole and an acrylonitrile content of 15-48 percent by weight. Because at least one liquid copolymer is employed, the mixture or covulcanizate produced has a low Mooney viscosity; as shown in Example 3 of the patent, ML 1+4/100° C.=33 ME. A nitrile rubber composition so produced would therefore find little utility in applications in which both ozone protection and heat stability are desirable, since it would exhibit poor processability and inferior physical properties, particularly heat stability.

Similarly, in U.S. Pat. No. 4,421,884, a low molecular weight liquid terpolymer of an unsaturated nitrile, a conjugated diene, and optionally a vinyl monomer are combined with a partially hydrogenated unsaturated nitrile/conjugated diene copolymer in specified quantities. As above, the rubbers so produced are recognized to have low Mooney viscosities, resulting in poor processability and physical properties, particularly heat resistance, among other problems. Furthermore, the addition of a vinyl monomer to the terpolymer adversely affects the heat resistance of the rubber so produced.

Thus, none of the systems previously proposed exhibit the desired combination of producing a polymer system offering heat resistance, weather resistance, low fuel and oil permeability, good processability, and relatively low cost required for many applications in which nitrile polymers are employed.

SUMMARY OF THE INVENTION

According to the present invention, nitrile copolymers having a high acrylonitrile content are blended with hydrogenated nitrile copolymers in order to obtain desirable weather and heat resistant properties. More specifically, first nitrile copolymers, having an acrylonitrile content greater than forty-five percent by weight or more, and a Mooney viscosity (ML 1+4/100° C.) of at least about 30 ME, are blended with solid, fully hydrogenated second nitrile copolymers, having an acrylonitrile content of at least eighteen percent and a Mooney viscosity (ML 1+4/100° C.) of at least 30 ME, in a ratio of approximately 70-50 percent first nitrile copolymer and 30-50 percent second nitrile copolymer, to produce a mixture or covulcanizate having a Mooney viscosity (ML 1+4/100° C.) of at least about 30 ME. Alternatively, the present invention may employ first nitrile copolymers having an acrylonitrile content in the range of 18-45 percent by weight, and a Mooney viscosity (ML 1+4/100° C.) of at least 30 ME, which are blended with fully hydrogenated second nitrile copolymers having an acrylonitrile content of at least eighteen percent and a Mooney viscosity (ML 1+4/100° C.) of at least 30 ME, in a ratio of approximately 65-50 percent first nitrile copolymer and 35-50 percent second nitrile copolymer.

Unlike previously proposed rubbers, such a mixture would have not only ozone, heat, fuel and oil resistance, but would be suitable for applications in which high Mooney viscosity is required for fabrication or other desirable characteristics.

Thus, the present invention provides an ozone and heat resistant polymer blend comprising a solid first nitrile copolymer having a Mooney viscosity (ML 1+4/100° C.) of at least 30 ME, prepared from unsaturated nitrile and a conjugated diene, a solid second, hydrogenated nitrile copolymer having a Mooney viscosity (ML 1+4/100° C.) of at least about 30 ME, prepared from unsaturated nitrile and a conjugated diene, wherein the ratio of first nitrile copolymer to second nitrile copolymer is from about 70:30 to about 50:50.

It is an object of the present invention to provide a blend of nitrile copolymers that exhibit superior weather and heat resistance.

It is another object of the invention to provide such a blend suitable for applications such as automobile hoses, belts, and the like, in which a polymer having a Mooney viscosity greater than about 30 is necessary to impart desired characteristics.

Still another object of the invention is to provide such a polymer blend at a lower cost than for a comparable hydrogenated nitrile rubber.

These and other objects of the invention will become apparent from the detailed description of the invention provided below.

DETAILED DESCRIPTION OF THE INVENTION

The first and second nitrile copolymer components of the present invention are well known in the art, and include many of the commercial nitrile copolymers available on the market.

The first nitrile copolymer component is a nitrile-conjugated diene copolymer, or nitrile rubber, characterized in that it includes polymers having an unsaturated nitrile content of at least eighteen percent, and preferably between forty-five and fifty-five percent, by weight. Unsaturated nitriles useful in the present invention include, for example, acrylonitrile and methacrylonitrile. Conjugated dienes that may be employed include, for example, 1,3-butadiene, isoprene, and 1,3-pentadiene. The first nitrile copolymer is preferably an acrylonitrile/butadiene copolymer.

The first nitrile copolymer should also be a solid copolymer having a Mooney viscosity (ML 1+4/100° C.) of at least about 30 ME. The actual Mooney viscosity and other characteristics of the polymer employed will be dependent upon the characteristics of the final polymer blend desired; thus, a high Mooney viscosity first polymer will ordinarily be employed to obtain a blend or covulcanizate having a high Mooney viscosity.

It is particularly desirable to employ a first nitrile copolymer having a high quantity of bound acrylonitrile, typically around fifty percent, to increase the resistance of the final blended polymer to oils, fuels and ozone. It has been found that nitrile copolymers having an acrylonitrile composition between eighteen and fifty-five percent by weight (and preferably 45-55 percent), and a Mooney viscosity of at least 30 ME and preferably from 45-50 ME, may be advantageously employed in the present invention. Such compositions are sold commercially by Copolymer Rubber & Chemical Corporation under the trademarks NYsyn® MDN131 (fifty percent bound AN, Mooney viscosity=50 ME), NYsyn® 406P (forty percent bound AN, Mooney viscosity=60 ME) and NYsyn® 33-5HM (33 percent bound AN, Mooney viscosity=50 ME).

The second nitrile copolymer is comprised of unsaturated nitrile monomers and conjugated diene monomers, which may be the same as or different from the monomers found in the first nitrile copolymer. The second nitrile copolymer is hydrogenated by any of the known methods for hydrogenating unsaturated nitrile copolymers, such as, for example, using a noble metal catalyst to hydrogenate dissolved polymer in the presence of a hydrogen atmosphere. The second copolymer is fully hydrogenated. An example of a useful composition is TORNAC® A-4555 (Polysar) (C=C unsaturation content 0 percent).

The first and second nitrile copolymers are combined in a Banbury or other mixer, preferably along with a curing agent to generate a covulcanizate. Because high service temperature properties are desirable, it has been found that peroxide curing agents, such as VUL-CUP® (Hercules), are most desirable; sulfur or other known curing agents may also be usefully employed. Optionally, other desirable components such as colorants, fillers, antioxidants, and the like may also be added.

The first and second nitrile copolymers, optional curing agent, and other optional components are then mixed to obtain a uniform composition throughout the material. After mixing, the compositions may preferably be cured, and then fabricated by any of the processes presently employed for fabrication of nitrile rubber products.

Table I provides information concerning various compositions of nitrile rubber tested to demonstrate the superior ozone resistance of the present invention; each of the components is described in Table II. Each of the compositions A-H were cured at 177° C. for 15 minutes, and exposed to an ozone rich atmosphere for seventy hours at 50 pphm, and one hundred hours at 100 pphm. The results of this testing is summarized in Table III.

TABLE I

| Component | A | B | C | D | E | F | G | H |
|---|---|---|---|---|---|---|---|---|
| TORNAC® C4550 | 100 | — | — | — | 50 | 50 | — | — |
| TORNAC® A4555 | — | 100 | — | — | — | — | 50 | 50 |
| NYsyn® MDN131 | — | — | 100 | — | 50 | — | 50 | — |
| NYsyn® 33-5HM | — | — | — | 100 | — | 50 | — | 50 |
| N650 Black | 25 | 25 | 25 | 25 | 25 | 25 | 25 | 25 |
| N990 Black | 35 | 35 | 35 | 35 | 35 | 35 | 35 | 35 |
| PARAPLEX® G-50 | 15 | 15 | 15 | 15 | 15 | 15 | 15 | 15 |
| NAUGUARD® 445 | 1 | 1 | 1 | 1 | 1 | 1 | 1 | 1 |
| VANOX® ZMTI | 0.4 | 0.4 | 0.4 | 0.4 | 0.4 | 0.4 | 0.4 | 0.4 |
| Zinc Oxide | 5 | 5 | 5 | 5 | 5 | 5 | 5 | 5 |
| VUL-CUP® 40 KE | 5 | 5 | 5 | 5 | 5 | 5 | 5 | 5 |

All units are parts per hundred rubber.

TABLE II

| Component | Properties |
|---|---|
| TORNAC® C4550 | Nitrile Rubber having 45% bound acrylonitrile, unsaturation = 8/1000 C = C, and Mooney viscosity (ML 1 + 4/100° C.) of 51. (Polysar) |
| TORNAC® A4555 | Nitrile Rubber having 45% bound acrylonitrile, unsaturation = 0/1000 C = C, and Mooney viscosity (ML 1 + 4/100° C.) of 56. (Polysar) |
| NYsyn® MDN131 | Nitrile rubber having 50% bound acrylonitrile, unsaturation = 141/1000 C = C, and Mooney viscosity (ML 1 + 4/100° C.) of 50. (Copolymer) |
| NYsyn® 33-5HM | Nitrile rubber having 33% bound acrylonitrile, unsaturation = 151/1000 C = C, and Mooney viscosity (ML 1 + 4/100° C.) of 50. (Copolymer) |
| PARAPLEX® G-50 | polyester adipate plasticizer (C. P. Hall) |
| NAUGUARD® 445 | substituted diphenylamine antioxidant (Uniroyal Chemical) |
| VANOX® ZMTI | zinc 2-mercaptotolylimidazole antioxidant |

TABLE II-continued

| Component | Properties |
|---|---|
| VUL-CUP ® 40KE | (R. T. Vanderbilt) a', a-bis(t-butyl peroxy)diisopropylbenzene on Burgess KE clay, organic peroxide curing agent (Hercules) |

As shown in Table III, ozone cracking is reduced in hydrogenated nitrile rubbers (see samples A and B) and is most significant in lower acrylonitrile content nitrile rubber (compare samples C and D). Ozone crack formation was completely suppressed when fully hydrogenated nitrile rubber was blended with the nitrile rubber compositions at a 50:50 ratio. This is shown by comparison of sample C with sample G and by comparison of sample D with sample H. By contrast, blends at a 50:50 weight ratio of nitrile rubber with partially hydrogenated nitrile rubber (samples E and F) showed only a slight improvement in ozone crack resistance.

TABLE III

| Test | A | B | C | D | E | F | G | H |
|---|---|---|---|---|---|---|---|---|
| Ozone 70 hours at 50 pphm | 1 | 0 | 6 | 8 | 5 | 6 | 0 | 0 |
| Ozone 100 hours at 100 pphm | 3 | 0 | 8 | 10 | 8 | 10 | 0 | 0 |

0 = no cracks
10 = maximum cracks

The results shown in Table IV illustrate the effect on ozone crack resistance caused by varying the ratio of nitrile rubber to hydrogenated nitrile rubber in the blend. The formulations and components are as employed in Table I, except that the ratios employed vary from 70:30 to 50:50.

TABLE IV

| Component | AA | BB | CC | DD | EE | FF | GG | HH | II | JJ | KK | LL | MM |
|---|---|---|---|---|---|---|---|---|---|---|---|---|---|
| TORNAC ® C-4550 | 30 | 30 | 0 | 0 | 0 | 0 | 0 | 0 | 50 | 50 | 45 | 45 | 40 |
| TORNAC ® A-4555 | 0 | 0 | 50 | 50 | 45 | 45 | 40 | 40 | 0 | 0 | 0 | 0 | 0 |
| NYsyn ® MDN131 | 70 | 0 | 50 | 0 | 55 | 0 | 60 | 0 | 50 | 0 | 55 | 0 | 60 |
| NYsyn ® 33-5HM | 0 | 70 | 0 | 50 | 0 | 55 | 0 | 60 | 0 | 50 | 0 | 55 | 0 |
| Units are parts per hundred rubber. CURED AT 177° C. FOR 15 MINUTES | | | | | | | | | | | | | |
| Ozone 70 hours at 50 pphm | 4 | 5 | 0 | 0 | 0 | 0 | 0 | 0 | 5 | 5 | 3 | 5 | 3 |
| Ozone 100 hours at 100 pphm | 9 | 9 | 0 | 0.5 | 0 | 2 | 1/0 | 3 | 9 | 9 | 9 | 9 | 9 |

| Component | NN | OO | PP | QQ | RR | SS | TT |
|---|---|---|---|---|---|---|---|
| TORNAC ® C-4550 | 40 | 35 | 35 | 0 | 0 | 0 | 0 |
| TORNAC ® A-4555 | 0 | 0 | 0 | 35 | 35 | 30 | 30 |
| NYsyn ® MDN131 | 0 | 65 | 0 | 65 | 0 | 70 | 0 |
| NYsyn ® 33-5HM | 60 | 0 | 65 | 0 | 65 | 0 | 70 |
| Units are parts per hundred rubber. CURED AT 177° C. FOR 15 MINUTES | | | | | | | |
| Ozone 70 hours at 50 pphm | 5 | 4 | 5 | 0 | 0 | 0 | 3 |
| Ozone 100 hours at 100 pphm | 9 | 9 | 9 | 0 | 3 | 0.5/0 | 6 |

0 = no cracks
10 = maximum cracks

The data set forth in Table IV reveals that very slight to no ozone cracking is observed over the entire range when the high acrylonitrile rubber is blended with the fully hydrogenated nitrile rubber. Higher quantities (35-50 weight percent) of fully hydrogenated rubber must be blended with the nitrile rubber having an acrylonitrile content less than 45 weight percent to achieve good ozone resistance under the more severe test conditions.

Table V is a compilation of data showing the effects of heat aging on the mechanical properties of each of the various blends of Table IV. The hydrogenated nitrile rubbers show better heat resistance than the nitrile rubbers, but the heat resistance of the latter was improved as a result of blending with the hydrogenated compositions. Oven aging at 257° F. was not severe enough to establish definite trends, but data taken for oven aging at 302° F. showed that improvement of oven aging characteristics occurred in the blends. This is particularly illustrated in comparisons of data for the 50/50 blend and the 70/30 blend. Notice, for example, that the 50/50 blend exhibits substantially better elongation retention than the 70/30 blend.

TABLE V

| | AA | BB | CC | DD | EE | FF | GG | HH | II | JJ | KK |
|---|---|---|---|---|---|---|---|---|---|---|---|
| AFTER AIR OVEN AGING 70 HRS. @ 257° F., 15' | | | | | | | | | | | |
| Tensile (psi) | 3045 | 3200 | 3276 | 3264 | 3166 | 3035 | 3202 | 3026 | 3255 | 3116 | 3184 |
| % change | 9.729 | 12.28 | 14.30 | 17.53 | 19.78 | 43.63 | 24.68 | 15.14 | 19.36 | 19.61 | 23.21 |
| Elongation (%) | 254 | 163 | 270 | 169 | 285 | 167 | 276 | 155 | 267 | 160 | 303 |
| % change | −30.6 | −8.93 | −28.9 | −6.62 | −28.3 | 15.17 | −19.0 | −13.4 | −23.2 | −7.51 | −22.9 |
| 100% Modulus | 1191 | 1817 | 1200 | 1867 | 1200 | 1614 | 1186 | 1845 | 1363 | 1739 | 1113 |
| % change | 43.49 | 11.81 | 17.30 | 25.80 | 50.75 | 19.20 | 49.55 | 37.68 | 55.23 | 16.24 | 37.40 |
| Hardness (Shore A) | 77 | 74 | 79 | 75 | 76 | 74 | 78 | 72 | 76 | 74 | 77 |
| Pts. change | 9 | 6 | 11 | 7 | 11 | 5 | 11 | 4 | 8 | 5 | 10 |
| AFTER AIR OVEN AGING 70 HRS. @ 302° F., 15' | | | | | | | | | | | |
| Tensile (psi) | 2446 | 2342 | 2284 | 2300 | 2292 | 1940 | 2048 | 1890 | 2171 | 1608 | 2088 |
| % change | −11.8 | −17.8 | −20.3 | −17.1 | −13.2 | −8.18 | −20.2 | −28.0 | −20.3 | −38.2 | −19.1 |

TABLE V-continued

|  |  |  |  |  |  |  |  |  |  |  |
|---|---|---|---|---|---|---|---|---|---|---|
| Elongation (%) | 90 | 59 | 78 | 54 | 81 | 87 | 89 | 50 | 58 | 34 | 77 |
| % change | −75.4 | −67.0 | −79.4 | −70.1 | −79.6 | −40 | −73.9 | −72.0 | −83.3 | −80.3 | −80.4 |
| 100% Modulus | — | — | — | — | — | — | — | — | — | — | — |
| % change | −100 | −100 | −100 | −100 | −100 | −100 | −100 | −100 | −100 | −100 | −100 |
| Hardness (Shore A) | 90 | 88 | 90 | 89 | 91 | 87 | 89 | 85 | 91 | 89 | 91 |
| Pts. change | 22 | 20 | 22 | 21 | 26 | 18 | 22 | 17 | 23 | 20 | 24 |

|  | LL | MM | NN | OO | PP | QQ | RR | SS | TT |
|---|---|---|---|---|---|---|---|---|---|
| AFTER AIR OVEN AGING 70 HRS. @ 257° F., 15' |  |  |  |  |  |  |  |  |  |
| Tensile (psi) | 3343 | 3017 | 2962 | 3115 | 3259 | 3133 | 3140 | 3079 | 3059 |
| % change | 27.06 | 16.44 | 8.777 | 19.30 | 27.25 | 20.87 | 32.21 | 19.11 | 21.82 |
| Elongation (%) | 185 | 282 | 166 | 286 | 182 | 266 | 171 | 256 | 157 |
| % change | −11.4 | −89.1 | −13.5 | −28.3 | −2.15 | −33.1 | −1.72 | −32.4 | −10.7 |
| 100% Modulus | 1810 | 1262 | 1662 | 1193 | 1777 | 1279 | 1666 | 1279 | 1816 |
| % change | 49.83 | 53.52 | 19.82 | 42.53 | 35.64 | 51.36 | 38.02 | 61.48 | 30.17 |
| Hardness (Shore A) | 74 | 75 | 73 | 76 | 74 | 77 | 74 | 76 | 72 |
| Pts. change | 6 | 8 | 4 | 8 | 5 | 8 | 6 | 9 | 4 |
| AFTER AIR OVEN AGING 70 HRS. @ 302° F., 15' |  |  |  |  |  |  |  |  |  |
| Tensile (psi) | 2149 | 2122 | 2268 | 1917 | 1743 | 1985 | 1889 | 1884 | 1907 |
| % change | −18.3 | −18.1 | −16.7 | −26.5 | −31.9 | −23.4 | −20.4 | −27.1 | −24.0 |
| Elongation (%) | 51 | 65 | 54 | 64 | 45 | 55 | 41 | 49 | 37 |
| % change | −75.5 | −97.4 | −71.8 | −83.9 | −75.8 | −86.1 | −76.4 | −87.0 | −78.9 |
| 100% Modulus | — | — | — | — | — | — | — | — | — |
| % change | −100 | −100 | −100 | −100 | −100 | −100 | −100 | −100 | −100 |
| Hardness (Shore A) | 90 | 90 | 89 | 90 | 87 | 91 | 89 | 91 | 87 |
| Pts. change | 22 | 23 | 20 | 22 | 18 | 22 | 21 | 24 | 19 |

Finally, the fuel resistance of the blends A-H (the compositions of which are set forth in Table I) was evaluated, as summarized by the data in Table VI. As shown, the hydrogenated nitriles have better dry heat resistance than the nitrile rubbers, but the nitrile rubbers exhibit better fuel resistance. The heat resistance of the hydrogenated nitrile rubber in fuel C at high temperatures and pressure was inferior to that of the nitrile rubber polymers. Blends of the polymers, however, exhibited a substantial improvement in heat and fuel resistance over the hydrogenated nitrile polymer, and blends of the fully hydrogenated polymers with nitrile rubber were superior than blends using partially hydrogenated nitrile rubber.

TABLE VI

| TEST | A | B | C | D | E | F | G | H |
|---|---|---|---|---|---|---|---|---|
| Mooney Viscosity ML 1 + 4 (100° C.) | 74.7 | 75.4 | 41.6 | 46.7 | 54.9 | 59.9 | 58.3 | 58 |
| Mooney Scorch 270° F. |  |  |  |  |  |  |  |  |
| Min. to 5 Pt. rise | 1 PR | 1 PR | 4 PR | 14.4 | 25 | 9.1 | 25.2 | 11.9 |
| Minimum Reading | 23 | 25 | 10 | 14 | 16 | 18 | 16 | 16 |
| Rheograph Properties ODR 350° F. 30 Min. Motor |  |  |  |  |  |  |  |  |
| Min. Torque, in-lbs | 6.6 | 7.8 | 3.0 | 7.1 | 5.5 | 9.5 | 5.2 | 9.3 |
| Max. Torque, in-lbs | 50.1 | 43.0 | 71.5 | 133.3 | 61.2 | 88.0 | 57.4 | 82.1 |
| T2, minutes | 1.1 | 1.2 | 1.1 | 0.8 | 1.1 | 0.8 | 1.1 | 0.8 |
| T90, minutes | 9.3 | 7.5 | 17.2 | 12.3 | 12.8 | 9.3 | 12.7 | 8.5 |
| Delta/Torque Press Cure @ 350° F. |  |  |  |  |  |  |  |  |
| Tensile, psi |  |  |  |  |  |  |  |  |
| 10' | 2537 | 2386 | 2392 | 1794 | 2412 | 2253 | 2220 | 2213 |
| 15' | 2653 | 2398 | 2347 | 1821 | 2378 | 2204 | 2374 | 2090 |
| 20' | 2427 | 2251 | 2286 | 1830 | 2343 | 2211 | 2186 | 2121 |
| Elongation, % | 500 | 500 | 329 | 146 | 366 | 219 | 365 | 192 |
|  | 479 | 521 | 387 | 180 | 355 | 223 | 371 | 233 |
|  | 502 | 490 | 357 | 161 | 373 | 214 | 339 | 183 |
| 100% Modulus, psi | 418 | 406 | 632 | 1009 | 514 | 773 | 547 | 1030 |
|  | 460 | 423 | 548 | 897 | 612 | 863 | 478 | 703 |
|  | 425 | 419 | 552 | 873 | 518 | 864 | 576 | 994 |
| 200% Modulus, psi | 1167 | 1121 | 1639 | — | 1474 | 2125 | 1493 | — |
|  | 1311 | 1149 | 1482 | — | 1703 | 2096 | 1437 | 1813 |
|  | 1097 | 1113 | 1510 | — | 1460 | 2113 | 1520 | — |
| 300% Modulus | 1947 | 1819 | 2236 | — | 2136 | — | 2126 | — |
|  | 2095 | 1860 | 2093 | — | 2302 | — | 2180 | — |
|  | 1841 | 1739 | 2119 | — | 2176 | — | 2116 | — |
| Hardness, Shore A | 58 | 58 | 55 | 61 | 59 | 63 | 59 | 61 |
|  | 60 | 59 | 59 | 60 | 60 | 63 | 58 | 62 |
|  | 60 | 60 | 56 | 61 | 60 | 64 | 59 | 64 |
| AFTER IMMERSION IN FUEL C 100% 70 Hours @ 257° F. |  |  |  |  |  |  |  |  |
| Tensile, psi | 627 | 672 | 939 | 960 | 424 | 971 | 1023 | 1010 |
| % change | −76.366 | −71.976 | −59.99 | −47.28 | −82.169 | −55.94 | −56.908 | −51.67 |
| Elongation, % | 651 | 614 | 395 | 302 | 574 | 276 | 400 | 262 |
| % change | 35.9081 | 17.8502 | 2.0671 | 67.777 | 61.6901 | 23.766 | 7.81671 | 12.446 |
| 100% Modulus | 234 | 250 | 307 | 312 | 227 | 390 | 350 | 419 |

TABLE VI-continued

| TEST | A | B | C | D | E | F | G | H |
|---|---|---|---|---|---|---|---|---|
| % change | −49.130 | −40.898 | −43.97 | −65.21 | −62.908 | −54.80 | −26.778 | −40.39 |
| Hardness, Shore A | 12 | 23 | 18 | 17 | 10 | 28 | 32 | 36 |
| Pts. change | −48 | −36 | −41 | −43 | −50 | −35 | −26 | −26 |
| Volume Change, % | 58.8 | 57.5 | 29.2 | 44.2 | 41 | 33.6 | 25.5 | 33.1 |

The present invention has been described with respect to certain embodiments and conditions, which are not meant to and should not be construed to limit the invention. Those skilled in the art will understand that variations from the embodiments and conditions described herein may be made without departing from the invention as claimed in the appended claims.

What is claimed is:

1. Nitrile rubber blends having improved ozone and heat resistant properties, comprising:

an unsaturated solid first nitrile copolymer having a Mooney viscosity (ML 1+4/100° C.) of at least 30 ME and an acrylonitrile content of at least forty-five percent by weight, prepared from an unsaturated nitrile and a conjugated diene;

a solid second, fully hydrogenated nitrile copolymer having a Mooney viscosity (ML 1+4/100° C.) of at least about thirty ME, prepared from an unsaturated nitrile and a conjugated diene;

wherein the ratio of first nitrile copolymer to second nitrile copolymer is from about 70:30 to about 50:50.

2. The polymer blend of claim 1, wherein said first nitrile copolymer is a copolymer of acrylonitrile and 1,3-butadiene.

3. The polymer blend of claim 1, wherein said second nitrile copolymer is a copolymer of acrylonitrile and 1,3-butadiene.

4. The polymer blend of claim 1, further comprising a curing agent.

5. The polymer blend of claim 4, wherein said curing agent is a peroxide.

6. The polymer blend of claim 1, further comprising one or more components selected from the group consisting of colorants, mineral fillers, antioxidants, and plasticizers.

7. The polymer blend of claim 4, further comprising one or more components selected from the group consisting of colorants, mineral fillers, antioxidants, and plasticizers.

8. Nitrile rubber blends having improved ozone and heat resistant properties, comprising:

an unsaturated solid first nitrile copolymer having a Mooney viscosity (ML 1+4/100° C.) of at least 30 ME and an acrylonitrile content of at least eighteen percent by weight, prepared from an unsaturated nitrile and a conjugated diene;

a solid second, fully hydrogenated nitrile copolymer having a Mooney viscosity (ML 1+4/100° C.) of at least about thirty ME, prepared from an unsaturated nitrile and a conjugated diene;

wherein the ratio of first nitrile copolymer to second nitrile copolymer is from about 65:35 to about 50:50.

9. The polymer blend of claim 8, wherein said first nitrile copolymer is a copolymer of acrylonitrile and 1,3-butadiene.

10. The polymer blend of claim 8, wherein said second nitrile copolymer is a copolymer of acrylontrile and 1,3-butadiene.

11. The polymer blend of claim 8, further comprising a curing agent.

12. The polymer blend of claim 11, wherein said curing agent is a peroxide.

13. The polymer blend of claim 8, further comprising one or more components selected from the group consisting of colorants, mineral fillers, antioxidants, and plasticizers.

14. The polymer blend of claim 11, further comprising one or more components selected from the group consisting of colorants, mineral fillers, antioxidants, and plasticizers.

15. A covulcanizate of the polymer blend of claim 1.

16. A covulcanizate of the polymer blend of claim 4.

17. A covulcanizate of the polymer blend of claim 6.

18. A covulcanizate of the polymer blend of claim 8.

19. A covulcanizate of the polymer blend of claim 11.

20. A covulcanizate of the polymer blend of claim 13.

* * * * *